United States Patent [19]

Hamada et al.

[11] 4,332,844

[45] Jun. 1, 1982

[54] SILICONE COMPOSITIONS FOR ADHESION AND METHOD FOR ADHERING SILICONE RUBBER TO A SUBSTRATE

[75] Inventors: Mitsuo Hamada, Kisarazu; Sadami Yasuda; Chiichiro Hasegawa, both of Ichihara, all of Japan

[73] Assignee: Toray Silicone Limited, Tokyo, Japan

[21] Appl. No.: 222,214

[22] Filed: Jan. 2, 1981

[30] Foreign Application Priority Data

Jan. 21, 1980 [JP] Japan .................................. 55/5512

[51] Int. Cl.$^3$ ............................................. B05D 3/02
[52] U.S. Cl. .................................... 427/387; 156/329; 427/208.2; 427/407.1; 427/409; 427/410; 427/412.1; 428/447; 428/448; 428/450; 528/17; 528/31; 528/33; 528/38
[58] Field of Search ................... 427/387, 208.2, 208.4, 427/407.1, 409, 410, 412.1; 156/329; 528/34, 17, 31, 33, 38; 428/447, 448, 450

[56] References Cited

U.S. PATENT DOCUMENTS

| | | | |
|---|---|---|---|
| 3,671,483 | 6/1972 | Young | 260/32.8 SB |
| 3,714,109 | 1/1973 | Matherly et al. | 260/32.8 SB |
| 3,772,122 | 11/1973 | Young | 156/329 |
| 3,873,334 | 3/1975 | Lee et al. | 106/287 SE |
| 3,960,800 | 6/1976 | Kohl | 260/32.8 SB |
| 4,122,127 | 10/1978 | Mikami et al. | 260/825 |
| 4,151,344 | 4/1979 | Doss et al. | 528/34 |

FOREIGN PATENT DOCUMENTS

| | | | |
|---|---|---|---|
| 556942 | 5/1958 | Canada | 156/329 |
| 52-40538 | 3/1977 | Japan | 156/329 |

*Primary Examiner*—Norman Morgenstern
*Assistant Examiner*—Thurman K. Page
*Attorney, Agent, or Firm*—Roger H. Borrousch

[57] ABSTRACT

A silicone composition prepared from an alkoxy-containing silicon compound, an organotitanate, and an organohydrogensilicon compound, optionally an organic solvent is useful for improving the adhesion between silicone rubber and a substrate.

22 Claims, No Drawings

SILICONE COMPOSITIONS FOR ADHESION AND METHOD FOR ADHERING SILICONE RUBBER TO A SUBSTRATE

BACKGROUND OF THE INVENTION

1. Field of the Invention

This invention relates to silicone compositions which exhibit an excellent adhesiveness and to a method of adhering silicone rubber to a substrate.

2. Description of the Prior Art

Conventionally, various primer compositions have been proposed for adhesion between silicone rubber and metals, between silicone rubber and different types of materials other than silicone rubber and between silicone rubbers. However, a satisfactory composition has not been found and investigations are continuing. Because silicone rubbers have characteristics such as mold releasability, heat resistance, electrical properties, chemical resistance, and solvent resistance, silicone rubbers have been used as embossing rolls for polyvinyl chloride, calender touch roll, extrusion laminating rolls and antistatic electricity rolls. In any of these cases, from a consideration of economic efficiency, a relatively inexpensive material is used in the layers below the roll surface layer. Thus, the adhesion between silicone rubber and the inexpensive material is always a matter of concern. Even for adhesion between silicone rubbers, adhesion becomes extremely difficult when different crosslinking systems are used. For example, adhesion is extremely difficult between a silicone rubber using an organic peroxide as the crosslinking agent and a silicone rubber obtained by an addition reaction or between a fluorosilicone rubber and a dimethylsilicone rubber. These problems cannot be satisfactorily solved using conventional primer compositions. Therefore, the poor adhesion between silicone rubber and organic materials using conventional primer compositions frequently cause trouble.

SUMMARY OF THE INVENTION

The silicone compositions of this invention are a solution to the adhesion problems described above. The compositions comprise a silicone compound containing an alkoxy group, an organotitanate, and an organohydrogensilicon compound. Such compositions are especially useful as a primer composition applied in an organic solvent. The composition can be used by applying it to a substrate, drying, and then applying unvulcanized silicone rubber containing a catalyst over the composition and curing the silicone rubber.

DESCRIPTION OF THE INVENTION

This invention relates to a silicone composition comprising (A) 100 parts by weight of an organosilicon compound having an average unit formula

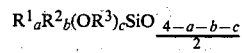

in which $R^1$ represents a monovalent radical selected from the group consisting of hydrocarbon radicals and halogenated hydrocarbon radicals; $R^2$ represents a monovalent organic radical containing a functional group selected from the group consisting of epoxy, methacryloxy, amino, and mercapto; $R^3$ represents an alkyl radical; a has a value of 0 to 3 inclusive; b has a value of 0 to 3 inclusive; c has a value such that $0 < c \leq 4$; and the sum of a+b+c has a value such that $0 < a+b+c \leq 4$; and said organosilicon compound containing at least one silicon-bonded alkoxy radical per molecule, (B) 5 to 500 parts by weight of an organotitanate, and (C) 5 to 1000 parts by weight of an organohydrogensilicon compound having an average unit formula

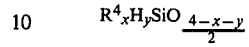

in which $R^4$ represents a monovalent radical selected from the group consisting of hydrocarbon radicals and halogenated hydrocarbon radicals; x has a value such that $0 < x \leq 3$; y has a value such that $0 < y \leq 2$; and the sum of x+y has a value such that $0 < x+y \leq 4$; and said organohydrogensilicon compound contains at least one SiH per molecule.

The organosilicon compounds of component (A) used in this invention contain at least one silicon-bound alkoxy group per molecule and can be expressed by the average unit formula

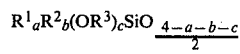

in which $R^1$ represents monovalent hydrocarbon radicals including alkyl radicals such as methyl, ethyl, and propyl, alkenyl radicals such as vinyl and allyl, aryl radicals such as phenyl, and their halogen-substituted monovalent hydrocarbon radicals; $R^2$ represents monovalent organic radicals containing a functional group such as epoxy, methacryloxy, amino or mercapto bonded to divalent organic radicals such as methylene, ethylene, propylene, phenylene, hydroxyl-substituted hydrocarbon radicals, chloroethylene, fluoroethylene,

—CH₂OCH₂CH₂CH₂—, —CH₂CH₂OCH₂CH₂—,

—CH₂CH₂OCH(CH₃)CH₂—, —CH₂OCH₂CH₂OCH₂CH₂—;

$R^3$ represents alkyl radicals such as methyl, ethyl, propyl, butyl, pentyl, octyl and decyl; a is $0 \leq a \leq 3$, b is $0 \leq b \leq 3$, c is $0 < c \leq 4$ and the relationship $0 < a+b+c \leq 4$ is satisfied. Component (A) includes alkoxysilanes such as tetraalkoxysilanes and organosilanes containing at least one silicon-bonded alkoxy group per molecule, alkylpolysilicate, and polyorganosiloxanes. The polyorganosiloxanes are primarily having linear, cyclic, or branched structures. In addition, a network or three-dimensional structure can be included in those structures. Homopolymers or copolymers can also be used. Some examples of component (A) are as follows: $Si(OC_2H_5)_4$, $Si(OC_3H_7)_4$, $(CH_3)Si(OC_2H_5)_3$, $(C_6H_5)Si(OCH_3)_3$, $(CH_2=CH)Si(OCH_3)_3$, $(CH_2=CH)_2Si(OCH_3)_2$, $(CH_2=CH)_3Si(OCH_3)$, ethylpolysilicate $(CF_3CH_2CH_2)Si(OC_2H_5)_3$,

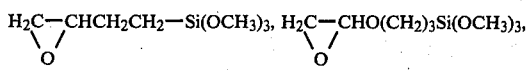

$HS(CH_2)_3—Si(OCH_3)_3$, $H_2N(CH_2)_3Si(OCH_3)_3$, $H_2NCH_2CH_2NH(CH_2)_3—Si(OCH_3)_3$,

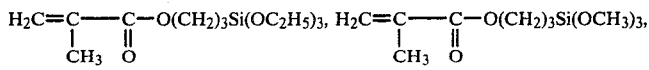

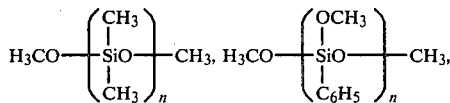

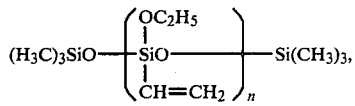

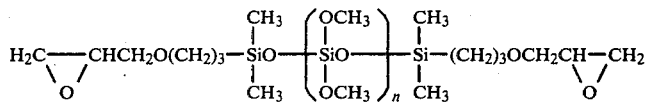

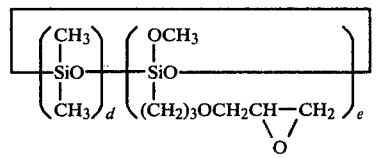

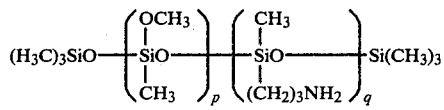

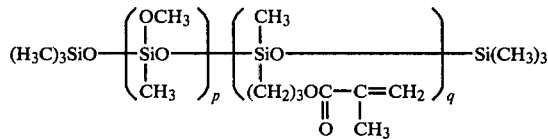

In the above formulae, n, p, and q are positive integers, e is at least one, and the sum of d and e is from 3 to 8 inclusive. Component (A) can be one type or a mixture of two or more types selected from among the compounds described above. The tetraalkoxysilanes and alkylpolysilicates are preferred.

The organotitanates of component (B) used in this invention are organotitanium compounds which can be expressed by the formulae

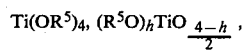

$\equiv$TiOR$^6$OTi$\equiv$,  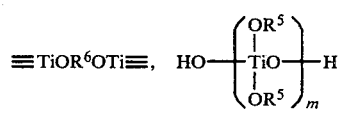

in which $R^5$ represents substituted or unsubstituted monovalent hydrocarbon radicals or monovalent carbonylalkyl radicals, $R^6$ represents substituted or unsubstituted divalent hydrocarbon radicals or divalent carbonylalkyl radicals, h is 1 to 3 inclusive and m is a positive integer. The bonds of the formula $\equiv$TiOR$^6$OTi$\equiv$ are connected to —OR$^5$ groups, —OH radicals, or —OR$^6$O—, preferably —OR$^5$ groups. The substituted hydrocarbon radicals of $R^5$ and $R^6$ includes those which contain as substituents, halogen atoms, amine groups, hydroxyl radicals, carbonyl groups, carboxy groups (ester), or ether groups. Chelate compounds of the above-mentioned organotitanates are included.

Some examples of component (B) are as follows: tetraethyltitanate, tetraisopropyltitanate, tetra-n-butyltitanate, tetra-2-ethylhexyltitanate, tetraphenyltitanate, tetraoctadecyltitanate, triethanolaminotitanate, [(HOC$_3$H$_6$)$_2$N(CH$_2$)$_3$O]$_2$Ti[OCH(C$_3$)$_2$]$_2$,

[C$_4$H$_9$NH(CH$_2$)$_4$O]$_4$Ti, 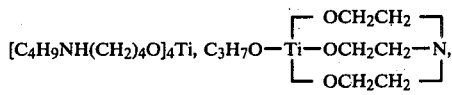

[HOOC(CH$_2$)$_4$O]$_2$ Ti(OH)$_2$,
(CH$_3$CH$_2$CH$_2$O)$_3$ TiOTi(OCH$_2$CH$_2$CH$_3$)$_3$,

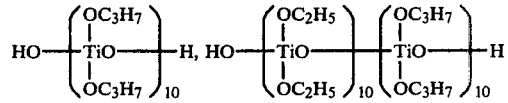

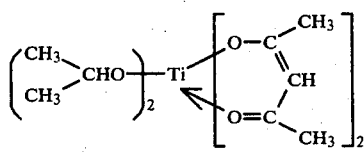

The mixing ratio of component (B) ranges from 5 to 500 parts by weight per 100 parts by weight of component (A). However, certain organotitanates may find use outside this mixing range. The preferred organotitanates are tetraalkyltitanates.

The organohydrogensilicon compounds of component (C) used in this invention are organosilanes or organopolysiloxanes, which compounds contain at least one SiH per molecule. The organohydrogensilicon compounds can be expressed by the average unit formula $$R^4{}_x H_y SiO_{\frac{4-x-y}{2}}$$

in which $R^4$ represents a monovalent hydrocarbon radical including alkyl radicals such as methyl, ethyl, and propyl; alkenyl radicals such as vinyl and allyl; and aryl radicals such as phenyl; and their halogen-substituted monovalent hydrocarbon radicals; x is $0 < x \leq 3$, y is $0 < y \leq 2$, and the relationship $0 < x+y \leq 4$ is satisfied. Preferably, linear, cyclic, or branched organohydrogenpolysiloxanes are used. However, component (C) can include compounds which have a network or three-dimensional structure. Any organohydrogenpolysiloxane containing at least one SiH group per molecule can be used. In addition, homopolymers or copolymers are applicable. Two or more types can be used as a mixture. The mixing ratio of component (C) ranges from 5 to 1000 parts by weight per 100 parts by weight of component (A). The preferred mixing ratio depends upon the SiH group content; thus, those organohydrogensilicon compounds which have a high SiH content can be used in smaller amounts whereas those with a low SiH content are preferably used in large amounts. Therefore, the use of compounds with either very low or very high SiH content could be useful in this invention outside the above-defined mixing ratio range. The preferred organohydrogensilicon compounds are polymethylhydrogensiloxane.

In the compositions of this invention, adhesion can be obtained to a certain degree by combining the two components (A) and (B) alone, but the obtained adhesion is not satisfactory. The adhesive effect is improved dramatically by the addition of component (C) and the compositions then exhibit excellent adhesive strength.

If desirable, in addition to the components (A), (B) and (C) used in this invention, organic solvents can be used. Examples of these organic solvents are a naphtha prepared from paraffinic petroleum having a boiling point of 43° to 140° C. and known as rubber solvent, n-heptane, toluene, xylene, methyl ethyl ketone, acetone, tetrahydrofuran and ethyl acetate. The mixing ratio of these solvents is not critical. If desirable, organosilanes and organopolysiloxanes other than those defined as components (A) and (C) can be used. If desirable, inorganic fillers such as fumed silica, precipitated silica, quartz powder, diatomaceous earth, calcium carbonate, mica, titanium oxide, iron oxide, alumina, and glass can be added with no problems.

The compositions of this invention are particularly useful as a primer, but they may also be used as a coating agent in a coating treatment. In addition, the compositions can be added as adhesion improvers to various rubbers, resins and paints. Moreover, the compositions themselves can be used in the form of adhesive cured products.

A preferred embodiment is a primer composition comprising 100 parts by weight of tetraalkoxysilane or alkylpolysilicate, 100 parts by weight of tetraalkyltitanate, 300 parts by weight of polymethylhydrogensiloxane, and 500 parts by weight of n-heptane.

The adhesion properties of the composition of this invention are particularly useful for adhering silicone rubber to a substrate. A particularly suitable method for adhering silicone rubber to a substrate comprises applying a coating of the silicone composition containing components (A), (B), and (C) to a substrate surface, drying the coating of the silicone composition, applying an unvulcanized silicone rubber containing a curing catalyst over the dried silicone composition, and thereafter curing the silicone rubber. This method preferably uses the primer composition of the preferred embodiment.

Examples of this invention will be cited below. "Parts" in each example means "parts by weight." The viscosity was measured at 25° C.

EXAMPLE 1

A silicone rubber used as a substrate was prepared by blending 100 parts of a dimethylvinylsiloxy endblocked polydiorganosiloxane gum having a degree of polymerization of 10,000 and consisting of 98.5 mol % $(CH_3)_2SiO$ units and 1.5 mol% $CH_3(CH_2\!=\!CH)SiO$ units, 50 parts of fumed silica having a specific surface area of 200 m²/g (trade name Aerosil 200 manufactured by Nippon Aerosil Co., Tokyo, Japan) and 10 parts of a hydroxyl endblocked polydimethylsiloxane having a viscosity of 0.00002 m²/s as a silica dispersant. The blending step was carried out in a kneader mixer and the mixture was heated at 150° C. for 3 hours to make a base compound. Subsequently, 1.5 parts of 2,4-dichlorobenzoyl peroxide was added to 100 parts of the base compound after it was cooled and thereafter homogeneously blended in a two-roll mixer. Thereafter, the resulting silicone rubber composition was vulcanized at 120° C. for 10 minutes under a pressure of 294 Pa. As a result, a smooth vulcanized silicone rubber sheet (Sheet A) with a thickness of 2 mm was obtained by the crosslinking action of the organic peroxide.

Subsequently, 2 parts of a trimethylsilyl endblocked polymethylhydrogensiloxane having a viscosity of 0.00001 m²/s, an amount of a solution of chloroplatinic acid in isopropyl alcohol sufficient to provide a platinum content of 200 ppm, and 0.05 part of 3-methyl-1-butyn-3-ol as an addition reaction inhibitor were added to 100 parts of the base compound and the resulting mixture was thoroughly blended in a two-roll mixer. An addition reaction-type, unvulcanized silicone rubber sheet (Sheet B) with a thickness of 2 mm was obtained.

Compositions shown in Table 1 were coated on one side of test pieces of Sheet A to form thin coats which were dried in air for 30 minutes. Sheet B was laid over the coated surface of Sheet A, and Sheet A was adhered to Sheet B by heating the assembly at 150° C. under a pressure of 294 Pa for 5 minutes which also resulted in the curing of Sheet B. The adhesion was examined by peeling these sheets apart. The obtained results are presented in Table 1. As shown in Table 1, there was 100% cohesive failure in all the compositions of this invention containing the polymethylhydrogensiloxane. Therefore, adhesion was found to be remarkably improved by the addition of component (C).

ple 1. The coating was dried in air for 2 hours. Subsequently, addition reaction-type, unvulcanized silicone rubber Sheet B as used in Example 1 was laid over the coated surface and both rubber sheets were adhered to each other by heating at a temperature of 150° C. under a pressure of 294 Pa for 5 minutes. The adhesion was examined by peeling the cured rubber sheets apart. In all cases, the rubber sheets were firmly adhered and exhibited 100% cohesive failure.

As comparative examples, compositions identified as Experiments Numbers 10–13 were also prepared by omitting component (C) from the compositions in the above-mentioned Experiment Nos. 6–9. The same treatment and test were conducted for these compositions. Surface peeling was observed in all comparative cases.

TABLE 1

| Component | Ingredients | Experiment No. This invention 1 | 2 | 3 | Comparative example 4 | 5 |
|---|---|---|---|---|---|---|
| (A) | a. Ethyl polysilicate (parts) | 10 | — | 5 | 10 | — |
| | b. n-Propyl orthosilicate (parts) | — | 3 | — | — | 3 |
| | c. 3,3,3-Trifluoropropyl-trimethoxysilane (parts) | — | 10 | — | — | 10 |
| | d. Vinyltrimethoxysilane (parts) | — | 10 | — | — | 10 |
| (B) | Tetrabutyltitinate (parts) | 10 | 10 | 5 | 10 | 10 |
| (C) | $(CH_3)_3SiO \left( \begin{array}{c} CH_3 \\ | \\ SiO \\ | \\ H \end{array} \right)_{20} Si(CH_3)_3$ (parts) | 30 | 30 | 5 | — | — |
| Solvent | n-Heptane (parts) | 50 | 50 | 50 | 50 | 50 |
| | Adhesiveness | 100% cohesive failure in all cases | | | Surface peeling in all cases | |

EXAMPLE 2

The compositions shown in Table II were thinly coated over one side of test pieces of Sheet A which had been vulcanized using an organic peroxide as in Exam-

TABLE 2

| Component | Ingredients | Experiment No. This invention 6 | 7 | 8 | 9 | Comparative example 10 | 11 | 12 | 13 |
|---|---|---|---|---|---|---|---|---|---|
| (A) | a. $H_2C\underset{O}{\overset{}{\diagdown\!\diagup}}CHCH_2CH_2Si(OCH_3)_3$ (parts) | 10 | — | — | — | 10 | — | — | — |
| | b. $H_2NCH_2CH_2NH(CH_2)_3Si(OCH_3)_3$ (parts) | — | 10 | — | — | — | 10 | — | — |
| | c. $H_2C=\underset{CH_3}{\overset{}{C}}-\underset{O}{\overset{\|}{C}}-O(CH_2)_3Si(OCH_3)_3$ (parts) | — | — | 10 | — | — | — | 10 | — |
| | d. $HS(CH_2)_3Si(OCH_3)_3$ (parts) | — | — | — | 10 | — | — | — | 13 |
| (B) | Tetrabutyltitinate (parts) | 5 | 5 | 5 | 5 | 5 | 5 | 5 | 5 |
| (C) | $(CH_3)_3SiO\left(\begin{array}{c}CH_3\\|\\SiO\\|\\CH_3\end{array}\right)_{10}\left(\begin{array}{c}CH_3\\|\\SiO\\|\\H\end{array}\right)_{5}Si(CH_3)_3$ (parts) | 15 | 15 | 15 | 15 | — | — | — | — |
| Solvent | Toluene (parts) | 50 | 50 | 50 | 50 | 50 | 50 | 50 | 50 |
| | Adhesiveness | 100% cohesive failure in all cases | | | | Surface peeling in all cases | | | |

EXAMPLE 3

Test pieces of vulcanized silicone rubber identified as Sheet A and the addition reaction-type, unvulcanized silicone rubber identified as Sheet B of Example 1 were used. The compositions shown in Table III, Experiment Nos. 14–16, and comparative compositions without component (C), Experiments Nos. 17–19, were prepared and the same test as in Example 2 was conducted on these prepared compositions. 100% cohesive failure was found in the compositions of this invention while surface peeling was found in all comparative cases.

TABLE 3

| Component | Ingredients | Experiment No. This invention 14 | 15 | 16 | Comparative example 17 | 18 | 19 |
|---|---|---|---|---|---|---|---|
| (A) | a. $(CH_3)_3SiO\left(\begin{array}{c}CH_3\\|\\SiO\\|\\CH_3\end{array}\right)_{30}\left(\begin{array}{c}OC_2H_5\\|\\SiO\\|\\CH_3\end{array}\right)_{10}Si(CH_3)_3$ (parts) | 20 | — | — | 20 | — | — |
| | b. $\left(\begin{array}{c}OCH_3\\|\\SiO\\|\\CH_3\end{array}\right)_{4}$ | — | 10 | — | — | 10 | — |
| | c. Liquid organopolysiloxane resin* (parts) | — | — | 30 | — | — | 30 |
| (B) | $[C_4H_9NH(CH_2)_4O]_4Ti$ (parts) | 5 | 5 | 5 | 5 | 5 | 5 |

TABLE 3-continued

| Component | Ingredients | Experiment No. This invention 14 | 15 | 16 | Comparative example 17 | 18 | 19 |
|---|---|---|---|---|---|---|---|
| (C) a. | 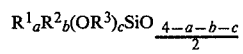 | 10 | — | 10 | — | — | — |
| b. | 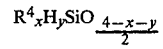 (parts) | — | 25 | — | — | — | — |
| Solvent | Toluene (parts) | 50 | 60 | 80 | 50 | 60 | 80 |
| | Adhesiveness | 100% cohesive failure in all cases | | | Surface peeling in all cases | | |

*Liquid organopolysiloxane resin containing 10% alkoxy groups and having a viscosity of 2 Pa · s prepared by the hydrolysis of a mixture consisting of 60 mol % $CH_3Si(OCH_3)_3$, 30 mol % $(CH_3)(CH_2=CH)Si(OC_2H_5)_2$ and 10 mol % $(C_6H_5)_2Si(OCH_3)_2$.

EXAMPLE 4

The following six compositions were used: a composition of Experiment No. 1, a comparative composition of Experiment No. 4, a composition of Experiment No. 6, a comparative composition of Experiment No. 10, a composition of Experiment No. 14, and a comparative composition of Experiment No. 17. These above-mentioned compositions were respectively coated followed by drying in air over one side of an aluminum plate or a stainless steel plate which had been cleaned in advance with trichloroethylene and dried. The addition reaction-type, unvulcanized silicone rubber identified as Sheet B of Example 1 was laid over the coated surface and the layer was treated by press vulcanization at 150° C. under a pressure of 294 Pa for 5 minutes. The same test as in Example 1 was repeated in order to examine the adhesion between the above-mentioned metals and the silicone rubber. In the cases using the compositions prepared in Experiment Nos. 1, 6 and 14, 100% cohesive failure was found while surface peeling was found in the cases using the compositions prepared in Experiment Nos. 4, 10 and 17 (in which component (C) was omitted from the compositions prepared in Experiment Nos. 1, 6 and 14).

EXAMPLE 5

A mixture of 100 parts of the cooled base compound prepared in Example 1 and 0.5 part of 2,5-dimethyl-2,5-di(tbutylperoxy)hexane was homogeneously blended in a two-roll mixer. The resulting product was removed from the roll and was formed into a sheet which was called unvulcanized silicone rubber Sheet C.

Subsequently, a mixture of 100 parts of a fluorosilicone rubber sold as Silastic ® LS-63U fluorosilicone rubber, by Dow Corning Corporation, Midland, Mich., U.S.A., and 0.5 part of 2,5-dimethyl-2,5-di(tbutylperoxy) hexane was homogeneously blended in a two-roll mixer. The resulting product was formed into a sheet which was called unvulcanized fluorosilicone rubber Sheet D.

The following four compositions were respectively coated and dried over one side of unvulcanized Sheet C: a composition of Experiment No. 2, a comparative composition of Experiment No. 5, a composition of Experiment No. 7 and comparative composition of Experiment No. 11. Compositions of Experiment Nos. 5 and 11 omitted component (C) from the compositions prepared in Experiment Nos. 2 and 7. Unvulcanized Sheet D was laid over the coated surface and the assembly was adhered by press vulcanization at 170° C. under a pressure of 294 Pa for 10 minutes. The adhesion at the adhered surfaces was examined in each case as in Example 1.

Adhesion using the composition prepared in Experiment No. 2 presented some surface peeling, but cohesive failure accounted for a large fraction. On the other hand, adhesion using the composition prepared in Experiment No. 7 showed 100% cohesive failure. On the contrary, complete surface peeling was observed in the cases using the compositions prepared in Experiment Nos. 5 and 11.

That which is claimed is:

1. A silicone composition consisting of
(A) 100 parts by weight of an organosilicon compound having an average unit formula $$R^1_a R^2_b (OR^3)_c SiO_{\frac{4-a-b-c}{2}}$$

in which $R^1$ represents a monovalent radical selected from the group consisting of hydrocarbon radicals and halogenated hydrocarbon radicals; $R^2$ represents a monovalent organic radical containing a functional group selected from the group consisting of epoxy, methacryloxy, amino, and mercapto; $R^3$ represents an alkyl radical; a has a value of 0 to 3 inclusive; b has a value of 0 to 3 inclusive; c has a value such that $0 < c \leq 4$; and the sum of $a+b+c$ has a value such that $0 < a+b+c \leq 4$; and said organosilicon compound containing at least one silicon-bonded alkoxy radical per molecule,
(B) 5 to 500 parts by weight of an organotitanate, and
(C) 5 to 1000 parts by weight of an organohydrogensilicon compound having an average unit formula $$R^4_x H_y SiO_{\frac{4-x-y}{2}}$$

in which $R^4$ represents a monovalent radical selected from the group consisting of hydrocarbon radicals and halogenated hydrocarbon radicals; x has a value such that $0 < x \leq 3$; y has a value such that $0 < y \leq 2$; and the sum of $x+y$ has a value such that $0 < x+y \leq 4$; and said organohydrogensilicon compound contains at least one SiH per molecule.

2. The silicone composition according to claim 1 in which an organic solvent is present.

3. The silicone composition according to claim 1 in which the organosilicon compound of (A) is selected from an alkoxysilane and an alkylpolysilicate.

4. The silicone composition according to claim 2 in which the organosilicon compound of (A) is selected from an alkoxysilane and an alkylpolysilicate.

5. The silicone composition according to claim 4 in which the organosilicon compound of (A) is a tetraalkoxysilane, the organotitinate of (B) is a tetraalkyltitanate and the organohydrogensilicon compound of (C) is a polymethylhydrogensiloxane.

6. The silicone composition according to claim 5 in which the tetraalkoxysilane is tetra-n-propoxysilane and the tetraalkyltitanate is tetrabutyltitanate and the organic solvent is n-heptane.

7. The silicone composition according to claim 4 in which the organosilicon compound of (A) is an alkylpolysilicate, the organotitanate of (B) is a tetraalkyltitanate, and the organohydrogensilicon compound of (C) is a polymethylhydrogensiloxane.

8. The silicone composition according to claim 7 in which the alkylpolysilicate is ethylpolysilicate, the tetraalkyltitanate is tetrabutyltitanate, and the organic solvent is n-heptane.

9. A method for adhering silicone rubber to a substrate comprising
applying a coating of a silicone composition to a substrate surface, said silicone composition consisting of (A) 100 parts by weight of an organosilicon compound having an average unit formula

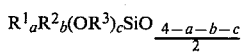

in which $R^1$ represents a monovalent radical selected from the group consisting of hydrocarbon radicals and halogenated hydrocarbon radicals; $R^2$ represents a monovalent organic radical containing a functional group selected from the group consisting of epoxy, methacryloxy, amino, and mercapto; $R^3$ represents an alkyl radical; a has a value of 0 to 3 inclusive; b has a value of 0 to 3 inclusive; c has a value such that $0 < c \leq 4$; and the sum of a+b+c has a value such that $0 < a+b+c \leq 4$; and said organosilicon compound containing at least one silicon-bonded alkoxy radical per molecule, (B) 5 to 500 parts by weight of an organotitanate, and (C) 5 to 1000 parts by weight of an organohydrogensilicon compound having an average unit formula

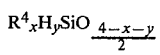

in which $R^4$ represents a monovalent radical selected from the group consisting of hydrocarbon radicals and halogenated hydrocarbon radicals; x has a value such that $0 < x \leq 3$; y has a value such that $0 < y \leq 2$; and the sum of x+y has a value such that $0 < x+y \leq 4$; and said organohydrogensilicon compound contains at least one SiH per molecule,
drying the coating,
applying an unvulcanized silicone rubber containing a curing catalyst over the dried coating, and thereafter
curing the silicone rubber.

10. The method in accordance with claim 9 in which the silicone composition contains an organic solvent.

11. The silicone composition according to claim 2 in which the organosilicon compound of (A) is a mixture of n-propylorthosilicate, 3,3,3-trifluoropropyltrimethoxysilane, and vinyltrimethoxysilane, the organotitanate of (B) is tetrabutyltitanate, the organohydrogensilicon compound of (C) is

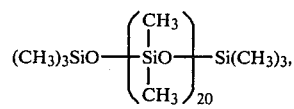

and the organic solvent is n-heptane.

12. The silicone composition according to claim 2 in which the organosilicon compound of (A) is

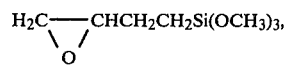

the organotitanate of (B) is tetrabutyltitanate, the organohydrogensilicon compound of (C) is

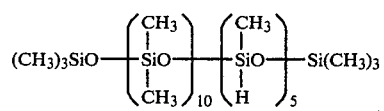

and the organic solvent is toluene.

13. The silicone composition according to claim 2 in which the organosilicon compound of (A) is

the organotitanate of (B) is tetrabutyltitanate, the organohydrogensilicon compound of (C) is

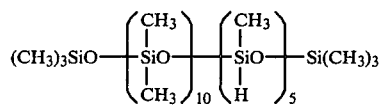

and the organic solvent is toluene.

14. The silicone composition according to claim 2 in which the organosilicon compound of (A) is

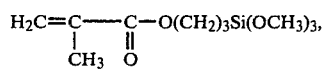

the organotitanate of (B) is tetrabutyltitanate, the organohydrogensilicon compound of (C) is

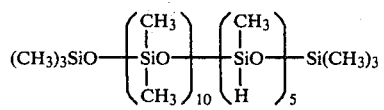

and the organic solvent is toluene.

15. The silicone composition according to claim 2 in which the organosilicon compound of (A) is HS(CH$_2$)$_3$Si(OCH$_3$)$_3$, the organotitanate of (B) is tetrabutyltitanate, the organohydrogensilicon compound of (C) is

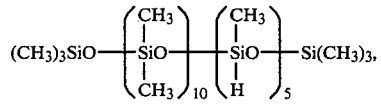

and the organic solvent is toluene.

16. The silicone composition according to claim 2 in which the organosilicon compound of (A) is

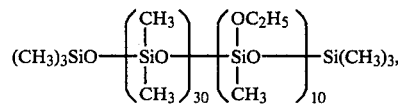

the organotitanate of (B) is

[C$_4$H$_9$NH(CH$_2$)$_4$O]$_4$Ti, the organohydrogensilicon compound of (C) is

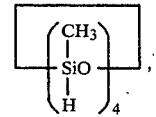

and the organic solvent is toluene.

17. The silicone composition according to claim 2 in which the organosilicon compound of (A) is

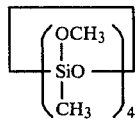

the organotitanate of (B) is

[C$_4$H$_9$NH(CH$_2$)$_4$O]$_4$Ti, the organohydrogensilicon compound of (C) is

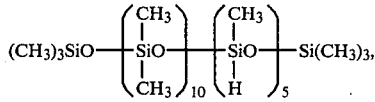

and the organic solvent is toluene.

18. The silicone composition according to claim 2 in which the organosilicon compound of (A) is liquid organopolysiloxane resin containing 10% alkoxy groups, having a viscosity of 2 Pa·s, and prepared by the hydrolysis of a mixture consisting of 60 mol % CH$_3$Si(OCH$_3$)$_3$, 30 mol % (CH$_3$)(CH$_2$=CH)Si(OC$_2$H$_5$)$_2$, and 10 mol % (C$_6$H$_5$)$_2$Si(OCH$_3$)$_2$, the organotitanate of (B) is

[C$_4$H$_9$NH(CH$_2$)$_4$O]$_4$Ti, the organohydrogensilicon compound of (C) is

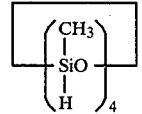

and the organic solvent is toluene.

19. The method in accordance with claim 10 in which the substrate is an organic peroxide vulcanized silicone rubber.

20. The method in accordance with claim 10 in which the substrate is aluminum.

21. The method in accordance with claim 10 in which the substrate is stainless steel.

22. The method in accordance with claim 10 in which the substrate is unvulcanized fluorosilicone rubber.

* * * * *